United States Patent Office 3,156,131
Patented Nov. 10, 1964

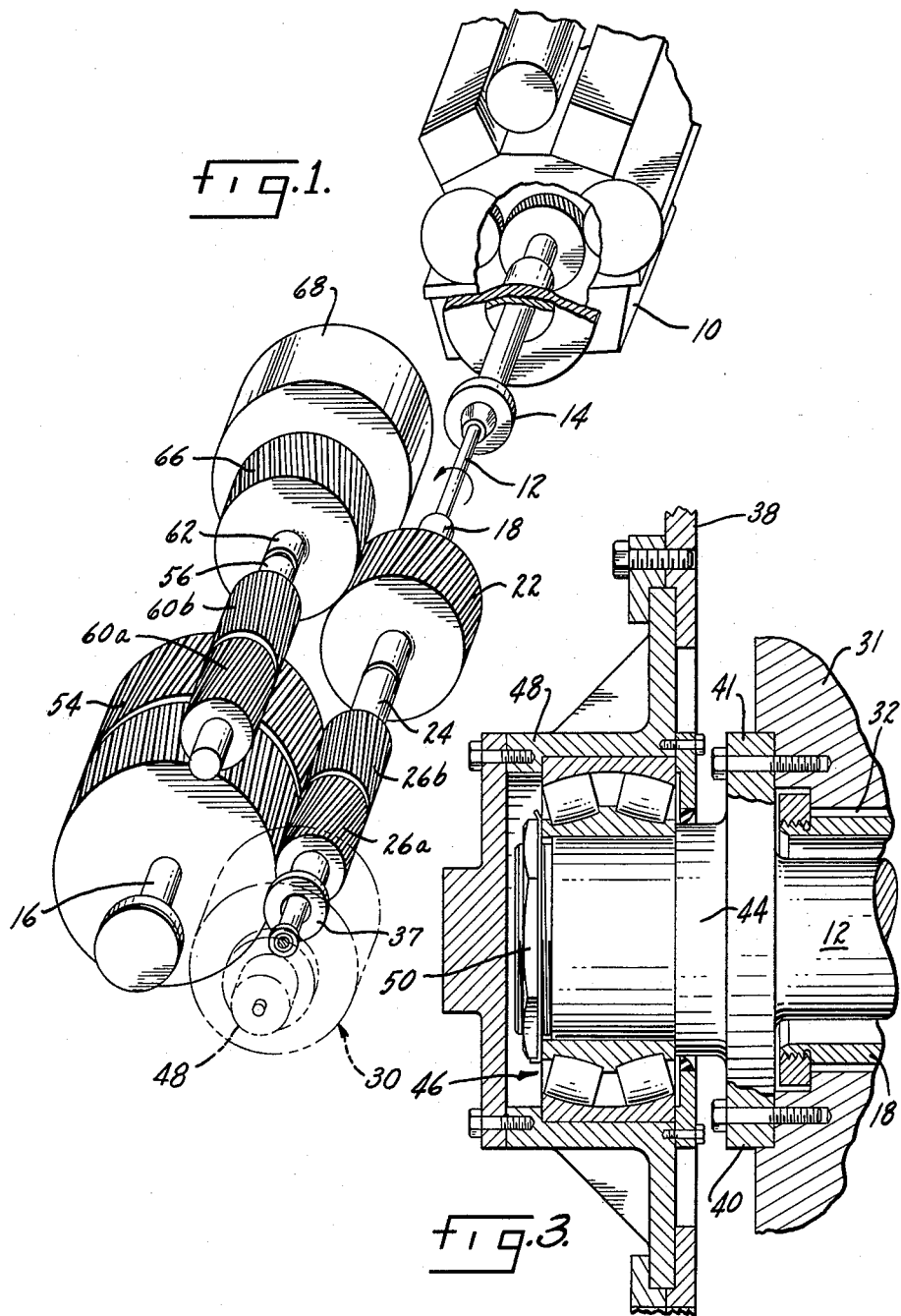

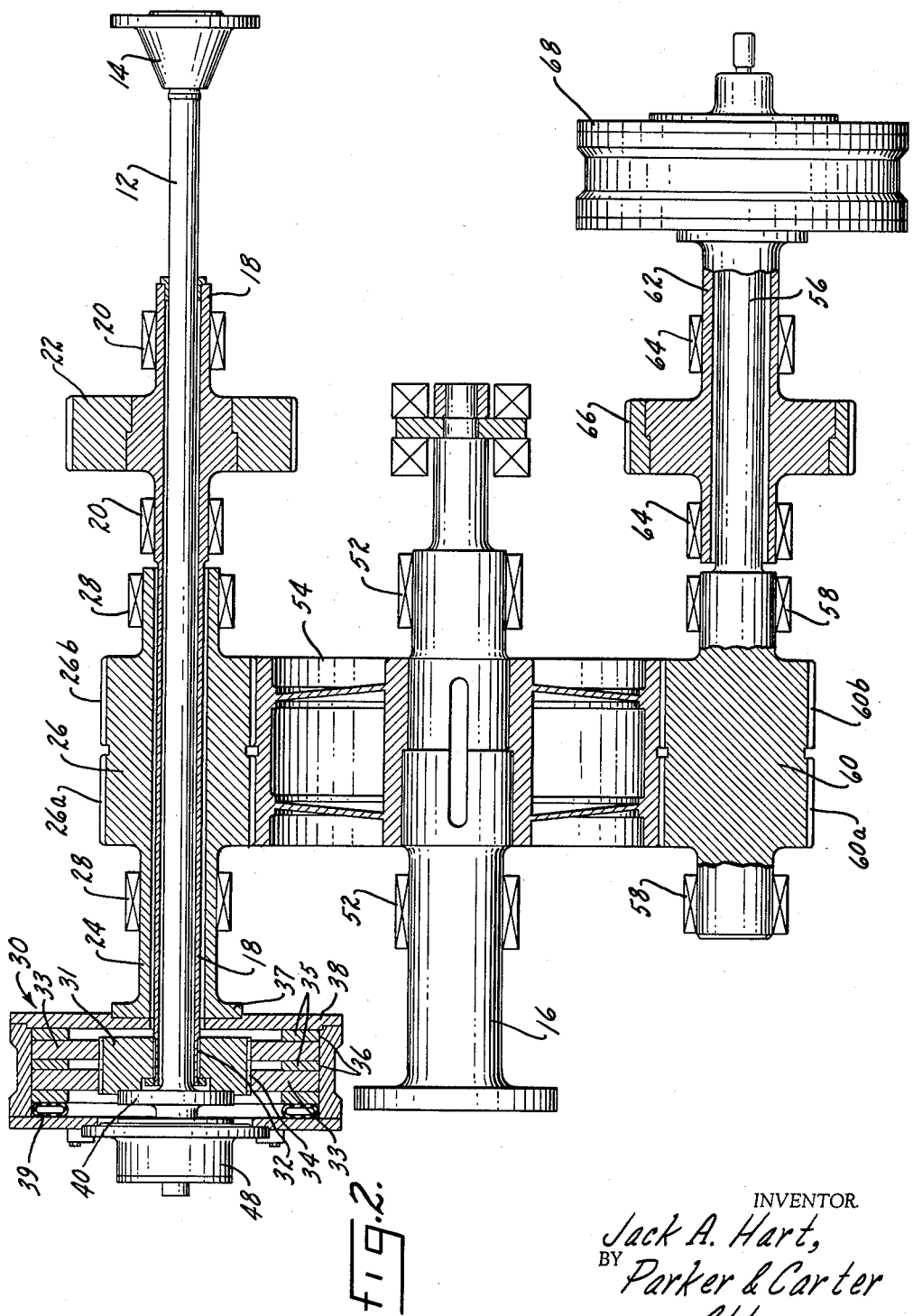

3,156,131
REVERSING TRANSMISSION WITH A THRUST
BEARING ON THE INPUT SHAFT
Jack A. Hart, Hales Corners, Wis., assignor to Nordberg
Manufacturing Company, Milwaukee, Wis., a corporation of Wisconsin
Filed June 12, 1962, Ser. No. 201,836
7 Claims. (Cl. 74—361)

This invention relates to a reversing drive for use in marine engines or the like, and particularly to a means for preventing axial loading of the drive shaft from being transferred back to the engine.

A primary purpose of the invention is a structure of the type described including a thrust bearing for the drive shaft which prevents axial loading of this shaft from being transferred to the engine bearings.

Another purpose is a structure of the type described which prevents axial loading of the engine bearings caused by wear on the clutch members.

Other purposes will appear in the ensuing specification, drawings and claims.

The invention is illustrated diagrammatically in the following drawings wherein:

FIGURE 1 is a perspective illustrating the drive arrangement described,

FIGURE 2 is an axial section through the gearing arrangement of FIGURE 1, spread out for purposes of illustration, and FIGURE 3 is an enlarged section through the end of the drive shaft.

In FIGURE 1, an engine 10 may have a drive shaft 12 coupled through any suitable coupling 14. When the invention is used on marine engines, there will conventionally be two engines, one the port engine and the other the starboard engine, however, for purposes of illustration of the invention, a single engine is shown. When used in a marine drive, a suitable propeller or the like, not illustrated, will be mounted on the end of a driven shaft 16.

An inner sleeve 18 extends axially along the drive shaft 12 and is radially spaced therefrom. The inner sleeve may be mounted in suitable bearings or the like 20, which may be positioned on opposite sides of a pinion 22 fixed to the sleeve 18. Concentric with the inner sleeve 18 and radially spaced therefrom is an outer sleeve 24, which also extends axially along the drive shaft 12, and mounts a pinion 26, the outer surface of which may be formed into two sections 26a and 26b, one having a right-hand helical configuration and the other having a left-hand helical configuration. The pinion 26 is known as the forward pinion and there may be suitable bearings or the like 28 positioned on opposite sides of it to support the outer sleeve.

Mounted at the end of the drive shaft 12 is a clutch indicated generally at 30 having an inner clutch member 31 connected to the inner sleeve 18, for example by a splined connection 32. Inner clutch plates 33 may be splined to the inner clutch member 31, as at 34, and outer clutch plates 35 may be splined to the housing, as at 36. The outer sleeve 24 may have an annular end flange 37, which is suitably connected to a housing 38 for the clutch 30. When the clutch 30 is operated by a suitable air mechanism 39, the clutch housing will be connected to the drive shaft 12 and will be driven thereby.

The drive shaft 12 may have an annular flange or shoulder 40 which is secured to the inner clutch member 32 by screws 41 or the like shown in FIGURE 3. The drive shaft 12 may also have an axial extension 44, illustrated in FIGURE 3, about which is mounted a thrust bearing indicated generally at 46. The thrust bearing may be enclosed by a cap 48 which may be part of the clutch housing 38. A suitable nut 50 or the like may be mounted on the end of the shaft extension 44 and is used to hold the bearing 46 in position.

The driven shaft 16, which may be supported in suitable spaced bearings 52, mounts a large gear 54 which is in mesh with the pinion 26 and has both right-hand and left-hand helical sections, as particularly illustrated in FIGURE 1.

A reversing shaft 56, which may be supported by suitable spaced bearings 58, has a pinion 60 in mesh with gear 54 and having sections 60a and 60b, one of which is a right-hand helical section and the other being a left-hand helical section. Concentric with the reversing shaft 56 and radially spaced therefrom is an axially extending sleeve 62, supported by spaced bearings 64 and mounting a pinion 66. As shown in FIGURE 1, the pinion 66 is in mesh with the reverse pinion 22 on the inner sleeve 18. This does not show in FIGURE 2 since the gearing is laid out or spread for clarity. Mounted at the end of the reversing shaft 56 is a suitable clutch 68, which may be an air-operated clutch and may be similar to the clutch illustrated at 30. Although no means are shown in the drawings for operating the clutches 30 and 68, these clutches may be either pneumatically or hydraulically operated, and their construction may be conventional. Normally only one of these clutches will be operated at a time as the clutch 30 is effective to drive the shaft 16 in the forward direction and the clutch 68 is effective to drive the shaft 16 in the reverse direction.

The use, operation and function of the invention are as follows:

Assuming that clutch 30 is operated, both the inner sleeve 18 and the outer sleeve 24 will be driven by the shaft 12. The shaft 16 will be driven in the forward direction through pinion 26 and the gear 54. Pinion 22 will be in mesh with pinion 66 on the reversing shaft and will drive sleeve 62. However, as clutch 68 is not operated, sleeve 62 will not be connected to reversing shaft 56 and hence the reversing shaft will be idling, within the sleeve 62, being driven from the gear 54.

Assuming now that clutch 30 is not operated and clutch 68 is operated, which is the procedure for driving shaft 16 in the opposite or the reverse direction, sleeve 18 will still be driven by the shaft 12, but outer sleeve 24 will not. Pinion 22 will drive pinion 66 and hence the outer sleeve 62. As clutch 68 is operated, sleeve 62 is connected to the reversing shaft 56 to thus drive the reversing shaft in a direction opposite from when clutch 30 is operated. Accordingly, pinion 60 will drive the gear 54 in the opposite direction. Outer sleeve 24 will be idling in the reverse direction because of its connection through pinion 26.

One of the problems in an arrangement of the type described is that the inner clutch member 31 of clutch 30 is splined to the inner clutch members 33. The clutch plates have a tendency to become heated which may result in misalignment and slight distortion. In any event, they will cant slightly which causes the spline 34 to gall. When this happens there will no longer be sufficient slippage in the splined connection and the thrust applied to the inner clutch member 31, when the clutch is operated, will apply a force to flange 40 and hence to the drive shaft 12. Such a thrust would be transmitted from the drive shaft back to the engine and to the engine bearings. Engine bearings are expensive and therefore a primary purpose of the invention is to prevent such a thrust from being transmitted back through the shaft to the engine. Accordingly, a thrust bearing, which will be considerably cheaper than an engine bearing, has been placed at the end of the shaft 12 in such a way as to take up or absorb any axial thrust applied to the shaft. Any thrust on the drive shaft 12, when the clutch operates, due to the galled condition of the spline will be taken by the thrust bearing 46 and not by the engine. Thus the engine is fully protected.

Although the invention has been described in connection with marine drives, obviously it may be applied to other types of engine drives in which it is necessary to prevent axial loading of the drive shaft from being transmitted back to the engine. In this same connection, the invention should not be limited to the particular gear arrangement shown.

Whereas the preferred form of the invention has been shown and described herein, it should be realized that there are many modifications, substitutions and alterations thereto within the scope of the following claims.

I claim:

1. In an engine drive arrangement, a drive shaft rotatable in one direction, a driven shaft, a gear assembly connecting said drive shaft and said driven shaft for driving said driven shaft in either direction including a clutch mounted at one end of said drive shaft for drivingly connecting a portion of said gear assembly to said drive shaft, said clutch including a first clutch member attached to said drive shaft and a second clutch member attached to said portion of said gear assembly, clutch operating means for drivingly connecting said first and second clutch members and including an axially movable connection with said first clutch member, and a thrust bearing mounted at said one end of the drive shaft to prevent any axial load from the axially movable connection with the first clutch member from being transmitted axially by the drive shaft toward an engine.

2. The structure of claim 1 further characterized in that said clutch includes a clutch housing generally concentric with said drive shaft and positioned adjacent its end, a cap fastened to said clutch housing and in axial alignment with said drive shaft, said thrust bearing being mounted in said cap.

3. The structure of claim 1 further characterized in that said gear assembly includes an inner sleeve concentric with said drive shaft and radially spaced therefrom, a connection between said inner sleeve and said drive shaft, an outer sleeve concentric with said first sleeve and radially spaced therefrom, said clutch being effective to connect said outer sleeve to said drive shaft.

4. The structure of claim 3 further characterized by a pinion on said outer sleeve and a gear on said driven shaft, said pinion and said gear being in mesh so that rotation of said outer sleeve will be transmitted to said driven shaft.

5. The structure of claim 4 further characterized by a pinion on said inner sleeve, a reversing shaft, a sleeve concentric with said reversing shaft and radially spaced therefrom, a pinion on said last-named sleeve in mesh with the pinion on the inner sleeve of the driving shaft, and a second clutch for connecting said reversing shaft with the sleeve concentric to it.

6. The structure of claim 5 further characterized by a pinion on said reversing shaft in mesh with the gear on said driven shaft.

7. The structure of claim 6 further characterized in that said first-named clutch, when operated, is utilized to drive said driven shaft in one direction, said second clutch, when operated, being utilized to drive said driven shaft in the opposite direction, only one of said clutch members being operated at a time.

References Cited in the file of this patent
UNITED STATES PATENTS 2,626,031     Fawick _____ Jan. 20, 1953
2,961,078     Shannon et al. _____ Nov. 22, 1960